(12) United States Patent
Patterson

(10) Patent No.: US 7,562,150 B2
(45) Date of Patent: *Jul. 14, 2009

(54) DELIVERING ELECTRONIC CONTENT

(75) Inventor: Patrick E. Patterson, Arlington, VA (US)

(73) Assignee: DRM Technologies, LLC, Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/889,610

(22) Filed: Aug. 15, 2007

(65) Prior Publication Data

US 2007/0288643 A1     Dec. 13, 2007

Related U.S. Application Data

(63) Continuation of application No. 11/412,827, filed on Apr. 28, 2006, now Pat. No. 7,272,655, which is a continuation of application No. 09/231,714, filed on Jan. 15, 1999, now Pat. No. 7,127,515.

(51) Int. Cl.
G06F 15/16 (2006.01)

(52) U.S. Cl. ...................... 709/229; 709/206

(58) Field of Classification Search ......... 709/202–203, 709/206–207, 229, 225, 223
See application file for complete search history.

(56) References Cited

U.S. PATENT DOCUMENTS

| | | | |
|---|---|---|---|
| 4,471,163 A | 9/1984 | Donald et al. |
| 4,528,643 A | 7/1985 | Freeny |
| 4,558,176 A | 12/1985 | Arnold et al. |
| 4,658,093 A | 4/1987 | Hellman |
| 4,683,553 A | 7/1987 | Mollier |
| 4,796,220 A | 1/1989 | Wolfe |
| 4,888,798 A | 12/1989 | Earnest et al. |
| 4,999,806 A | 3/1991 | Chernow et al. |
| 5,023,907 A | 6/1991 | Johnson et al. |
| 5,033,084 A | 7/1991 | Beecher |
| 5,057,935 A | 10/1991 | Williams |
| 5,103,476 A | 4/1992 | Waite et al. |
| 5,113,518 A | 5/1992 | Durst, Jr. et al. |
| 5,191,611 A | 3/1993 | Lang |
| 5,204,897 A | 4/1993 | Wyman |
| 5,319,705 A | 6/1994 | Halter et al. |

(Continued)

FOREIGN PATENT DOCUMENTS

CA    2 220 457    5/1998

(Continued)

OTHER PUBLICATIONS

Supplementary European Search Report dated Jan. 17, 2006.

(Continued)

*Primary Examiner*—Paul H Kang
(74) *Attorney, Agent, or Firm*—McGuireWoods LLP

(57) ABSTRACT

Delivering electronic content includes providing instructions that might cause a computer to collect information including a network address and transmitting the collected information to a receiving computer. The computer that receives the transmitted information selects electronic content based on the received information and sends the selected electronic content to the network address included in the received information. Access to the electronic content might be selectively granted based on criteria.

40 Claims, 14 Drawing Sheets

U.S. PATENT DOCUMENTS

| | | |
|---|---|---|
| 5,337,357 A | 8/1994 | Chou et al. |
| 5,351,293 A | 9/1994 | Michener et al. |
| 5,390,297 A | 2/1995 | Barber et al. |
| 5,490,216 A | 2/1996 | Richardson, III |
| 5,509,070 A | 4/1996 | Schull |
| 5,615,264 A | 3/1997 | Kazmierczak et al. |
| 5,629,980 A | 5/1997 | Stefik et al. |
| 5,654,746 A | 8/1997 | McMullan, Jr. et al. |
| 5,666,411 A | 9/1997 | McCarty |
| 5,671,276 A | 9/1997 | Eyer et al. |
| 5,671,279 A | 9/1997 | Elgamal |
| 5,673,316 A | 9/1997 | Auerbach et al. |
| 5,677,953 A | 10/1997 | Dolphin |
| 5,703,279 A | 12/1997 | Igura et al. |
| 5,703,951 A | 12/1997 | Dolphin |
| 5,708,709 A | 1/1998 | Rose |
| 5,708,780 A | 1/1998 | Levergood et al. |
| 5,715,314 A | 2/1998 | Payne et al. |
| 5,724,424 A | 3/1998 | Gifford |
| 5,765,152 A | 6/1998 | Erickson |
| 5,778,173 A | 7/1998 | Apte |
| 5,778,367 A | 7/1998 | Wesinger, Jr. et al. |
| 5,784,460 A | 7/1998 | Blumenthal et al. |
| 5,790,664 A | 8/1998 | Coley et al. |
| 5,790,790 A | 8/1998 | Smith et al. |
| 5,794,207 A | 8/1998 | Walker et al. |
| 5,796,952 A | 8/1998 | Davis et al. |
| 5,889,860 A | 3/1999 | Eller et al. |
| 5,889,943 A | 3/1999 | Ji et al. |
| 5,892,825 A | 4/1999 | Mages et al. |
| 5,892,900 A | 4/1999 | Ginter et al. |
| 5,905,860 A | 5/1999 | Olsen et al. |
| 5,926,624 A | 7/1999 | Katz et al. |
| 5,956,505 A | 9/1999 | Manduley |
| 5,958,005 A | 9/1999 | Thorne et al. |
| 5,958,051 A | 9/1999 | Renaud et al. |
| 5,959,945 A | 9/1999 | Kleiman |
| 5,963,915 A | 10/1999 | Kirsch |
| 5,982,889 A | 11/1999 | DeMont |
| 6,014,688 A | 1/2000 | Venkatraman et al. |
| 6,021,491 A | 2/2000 | Renaud |
| 6,035,329 A | 3/2000 | Mages et al. |
| 6,041,411 A | 3/2000 | Wyatt |
| 6,055,570 A | 4/2000 | Nielsen |
| 6,067,526 A | 5/2000 | Powell |
| 6,067,622 A | 5/2000 | Moore |
| 6,073,124 A | 6/2000 | Krishnan et al. |
| 6,073,256 A | 6/2000 | Sesma |
| 6,075,862 A | 6/2000 | Yoshida et al. |
| 6,098,056 A | 8/2000 | Rusnak et al. |
| 6,134,592 A | 10/2000 | Montulli |
| 6,138,149 A | 10/2000 | Ohmura |
| 6,144,942 A | 11/2000 | Ruckdashel |
| 6,178,442 B1 | 1/2001 | Yamazaki |
| 6,192,396 B1 | 2/2001 | Kohler |
| 6,205,485 B1 | 3/2001 | Kikinis |
| 6,253,193 B1 | 6/2001 | Ginter et al. |
| 6,256,672 B1 | 7/2001 | Redpath |
| 6,266,692 B1 | 7/2001 | Greenstein |
| 6,288,738 B1 | 9/2001 | Dureau et al. |
| 6,289,461 B1 | 9/2001 | Dixon |
| 6,304,897 B1 | 10/2001 | Venkatraman et al. |
| 6,314,454 B1 | 11/2001 | Wang et al. |
| 6,332,156 B1 | 12/2001 | Cho et al. |
| 6,385,596 B1 | 5/2002 | Wiser et al. |
| 6,389,541 B1 | 5/2002 | Patterson |
| 6,449,719 B1 | 9/2002 | Baker |
| 6,484,156 B1 | 11/2002 | Gupta et al. |
| 6,567,793 B1 | 5/2003 | Hicks et al. |
| 6,684,248 B1 | 1/2004 | Janacek et al. |
| 6,751,670 B1 | 6/2004 | Patterson |
| 2005/0021633 A1 | 1/2005 | Venkatraman et al. |

FOREIGN PATENT DOCUMENTS

| | | |
|---|---|---|
| EP | 0 717 338 | 6/1996 |
| WO | WO 96/27155 | 9/1996 |
| WO | WO 98/30964 | 7/1998 |
| WO | WO 98/58306 | 12/1998 |

OTHER PUBLICATIONS

U.S. Appl. No. 11/400,394 filed Apr. 10, 2006.
Mark A Kaplan "IBM Cryptolopes, SuperDistribution and Digital Rights Management" Dec. 30, 1996, pp. 1-9.
"Ziplock White Paper" Jan. 27, 1997, pp. 1-12.
Information Sciences Institute, University of Southern California "Transmission Control Protocol DARPA Internet Program Protocol Specification" Sep. 1981, preface to p. 85.
Butler Lampson "Anti-Piracy" Oct. 26, 1997, pp. 1-9.
Steve R. White and Liam Comerford "ABYSS: An Architecture for Software Protection" IEEE Transactions on Software Engineering. vol. 16 No. 6 Jun. 1990, pp. 619-629.
TragoeS FAQ—"Right Market Frequently Asked Questions (FAQ)" Jun. 30, 1997, pp. 1-5.
PR Newswire "Silver Bullet for Digital Publishing Arrives TragoeS Announces General Availability of RightsMarket (TM)" Dec. 2, 1997, pp. 1-4.

```
<HTML>
<HEAD>
<TITLE>AGN Financial Newsletter - AGN Capital Management Inc.</TITLE>

<script>function writeBox(checkvalue)
  {
    var quote=document.form1.box.value
    var quote2="http://www.viaexpress.com/scripts/savemail.cgi?site=www.bannersite.com&file=dave.exe&email="+quote
    clk = window.open( "email.htm","email",
        "toolbar=no,location=no,directories=no,status=no,scrolbars=no,
        menubar=no,resizable=no,width=200,height=100");
    document.form1.boxvalue=""
  }
</script>

</HEAD>
<BODY BACKGROUND="bg.gif" bgcolor="#FFFFFF" text=#000000" link="0000CC" vlink="#0000CC" alink="#FF0000">
<CENTER>
<table cellspacing+2 cellpadding=5 border=4>
<tr>
<td width=100%align=center bgcolor=FFFFFF>
  <form name="form1">
    <IMG SRC="golfban.gif" ALT="Enter your Email address here to WIN!" BORDER=0>
    <input type=text value="" name=box size=18">
    <input type=button value="Submit" onClick="writeBox0" height=2>
</td>
</tr>
</form>

</center>
</table>
<BR BR>
<table border=0 cellpadding=0 cellspacing=0 width="600">
<tr>
<td> </td>
<td colspan=2 align=right valign=top>
<img src="newslett.gif" alt=AGN Financial Newsletter."width=470 height=83 border=0 br>
<b font sixe=+2>May 1998</font /b p>
</td>
</tr>
```

*FIG 6A*

```
<tr>
 <td valign="top">
  <a href=http://www.agnfin.com/index.html"  img src="home.gif" alt="Back to home page." width=120 height=54 border=0 /a br>
  <a href=http://www.agnfin.com/about.html"  img src="about.gif" alt="About AGN."width=120 height=54 border=0 /a br>
  <a href=http://www.agnfin.com/assetmanagement.html"  img src="asset.gif" alt="Asset management." width=120 height=54 border=0 /a br>
  <a href=http://www.agnfin.com/contactus.html"  img src="contact.gif" atl="Contact information." width=120 height=54 border=0 /a br>
  <a href+http://www.agnfin.com/criteria.html"  img src="criteria.gif"alt=Investment criteria."width=120 height=54 border=0 /a br>
  <a href=http://www.agnfin.com/howto.html"  img src="howto.gif"atl="About the AGN financial newsletter." width=120 height=54 border=0 /a br>
  <a href=http://www.agnfin.com/subscribe.html"   img src="subscribe.gif"atl="Subscribe to the newsletter." width=120 height=54 border=0 /a br>
  <a href=http://www.agnfin.com/disclaimer.html"   img src="disclosu.gif"atl="Disclosure & disclaimer." width=120 height=54 border=0 /a br>
  <a href=http://www.agnfin.com/en_espanol.html"   img src="en_espan..gif"atl="En Espanol." width=120 height=54 border=0 /a br>

<img src="dot.gif"width+135 height=1 border=0 hspace=0 vspace=0 alt="*"  br>
 </td>
 </td>

<br>
 </td>

<td valign="top">
```

FIG 6B

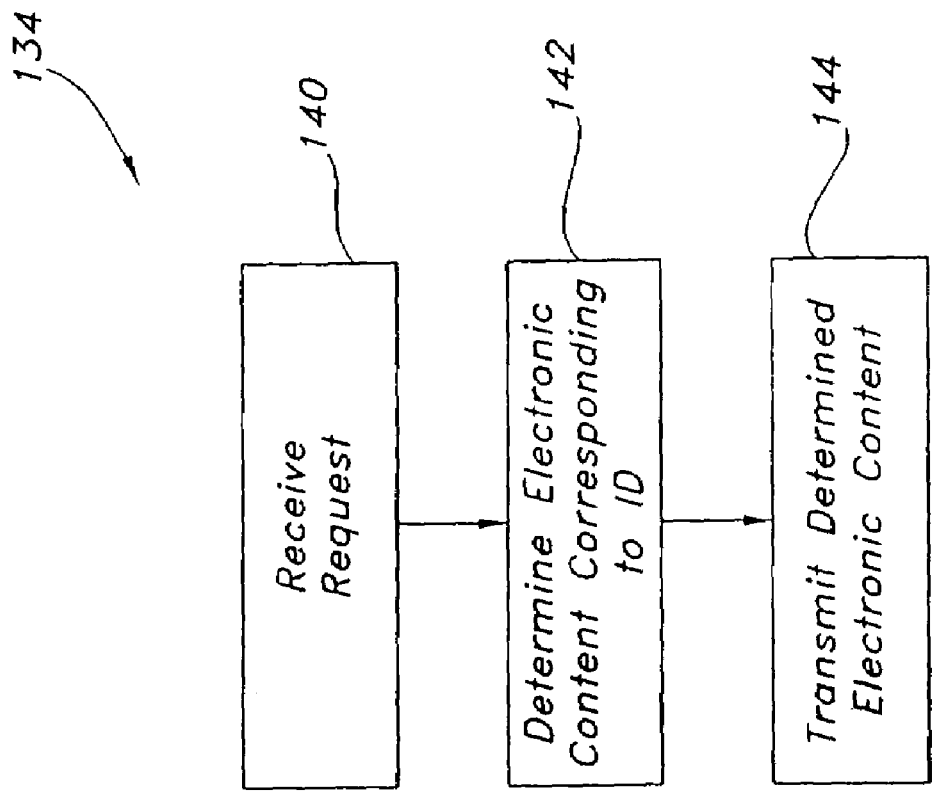

DELIVERING ELECTRONIC CONTENT

CROSS-REFERENCE TO RELAYED APPLICATIONS

This is a continuation of U.S. patent application Ser. No. 11/412,827 filed Apr. 28, 2006, which is a continuation of U.S. patent application Ser. No. 09/231,714 filed Jan. 15, 1999, the disclosures of which are incorporated by reference in their entirety.

BACKGROUND OF THE INVENTION

1. Field of the Invention

This invention generally relates to delivering electronic content.

2. Related Art

The Internet offers a tremendous amount of information on a wide range of subjects. Many businesses and organizations offer world-wide-web sites that promote products, offer technical assistance, and provide other useful information. Search engines (e.g., Yahoo™) typically can provide lengthy lists of sites related to any topic of interest. Users typically do not want to take the time to investigate more than a handful of these sites. As a result, the vast number of web-sites makes it difficult for web-site providers to lure Internet users to their respective sites.

Since the inception of the web, web-pages have featured links to other sites. A link can appear as underlined text (e.g., "please visit deskgate"), as a picture, or as a sequence of images. Each link has an associated URL (universal resource locator) that identifies a web-site. A link can be programmed to transport a user to a link's associated URL when a user selects the link (e.g., by clicking a mouse button).

To attract users to a site, some businesses rent space on other web-pages. For example, as shown in FIG. 1, a newspaper web-page 100 includes a variety of links to other sites. As shown, the web-page includes a banner 102 (i.e., a picture link in the shape of a banner) linked to a resort's web-site. By selecting the link, the user is transported to the resort's web-page as shown in FIG. 2.

SUMMARY

In general, in one aspect, a method of delivering electronic content includes providing instructions that cause a first computer to collect information including an e-mail address, and transmitting the collected information to a second computer. The second computer processes the transmitted information by selecting electronic content for transmission to the e-mail address and e-mailing the selected electronic content.

Embodiments may include one or more of the following. The instructions can be web-page instructions such as HTML. The instructions can be of a form. The instructions can collect the information by querying the computer or by receiving user input. The information can include demographic information and/or system information.

The processing can be done by a program such as a script (e.g., a CGI script). A URL (universal resource locator) displayed at a browser using the instructions may not be altered by the transmitting of the collected information. The processing can select electronic content based on the transmitted information. The electronic content can include text, graphics, audio, video and/or executable instructions.

The information transmitted can include identification of the instructions that transmitted the information and/or identification of a site that transmitted the information.

In general, in another aspect, a method of delivering electronic content includes providing web-page form instructions that cause a first computer to interactively collect an e-mail address from a user and transmit information including the collected address information to a second computer. The method further includes processing the transmitted information at the second computer by using the transmitted information to select electronic content and e-mailing the selected electronic content to the transmitted e-mail address.

In general, in another aspect, a method of delivering electronic content includes storing electronic content corresponding to different sets of instructions, receiving a request for electronic content produced by one of the sets of instructions, the request including a network address, and selecting electronic content from the stored electronic content based on the received request. The selected electronic content is transmitted to the network address included in the request.

In general, in another aspect, a computer-implemented method of providing access to electronic content includes displaying in a browser a web-page that includes a link corresponding to electronic content and in response to a user's selection of the link, collecting information without modifying the web-page displayed in the browser. The collected information is transmitted to a remote server, and electronic content from the remote server is sent to the e-mail address based on the collected information.

In general, in another aspect, a computer program, disposed on a computer readable medium, includes instructions for causing a first computer's processor to receive information collected by instructions at a second computer, and based on the received information, select electronic content and transmit the electronic content to an e-mail address included in the received information.

Advantages may include one or more of the following. By linking an e-mail based electronic content delivery system to a web-page, businesses can enjoy the benefits of reaching "web-surfers" without the cost and/or computer resources needed to maintain a web-site. Linking in this manner also provides Internet users with the ability to get more information about a topic without leaving a web-page and without waiting for graphics and other information to be transmitted to their browser. A business providing electronic content can not only receive demographic data describing interested users, but also can determine which web-pages are most effective in producing requests for information.

Other advantages of the invention will become apparent in view of the following description, including the figures, and the claims.

DRAWING DESCRIPTIONS

FIG. 6 is a listing of web-page instructions, according to principles of the invention.

FIG. 8 is a flow chart of distribution software, according to principles of the invention.

DETAILED DESCRIPTION OF THE INVENTION

Figure 1:
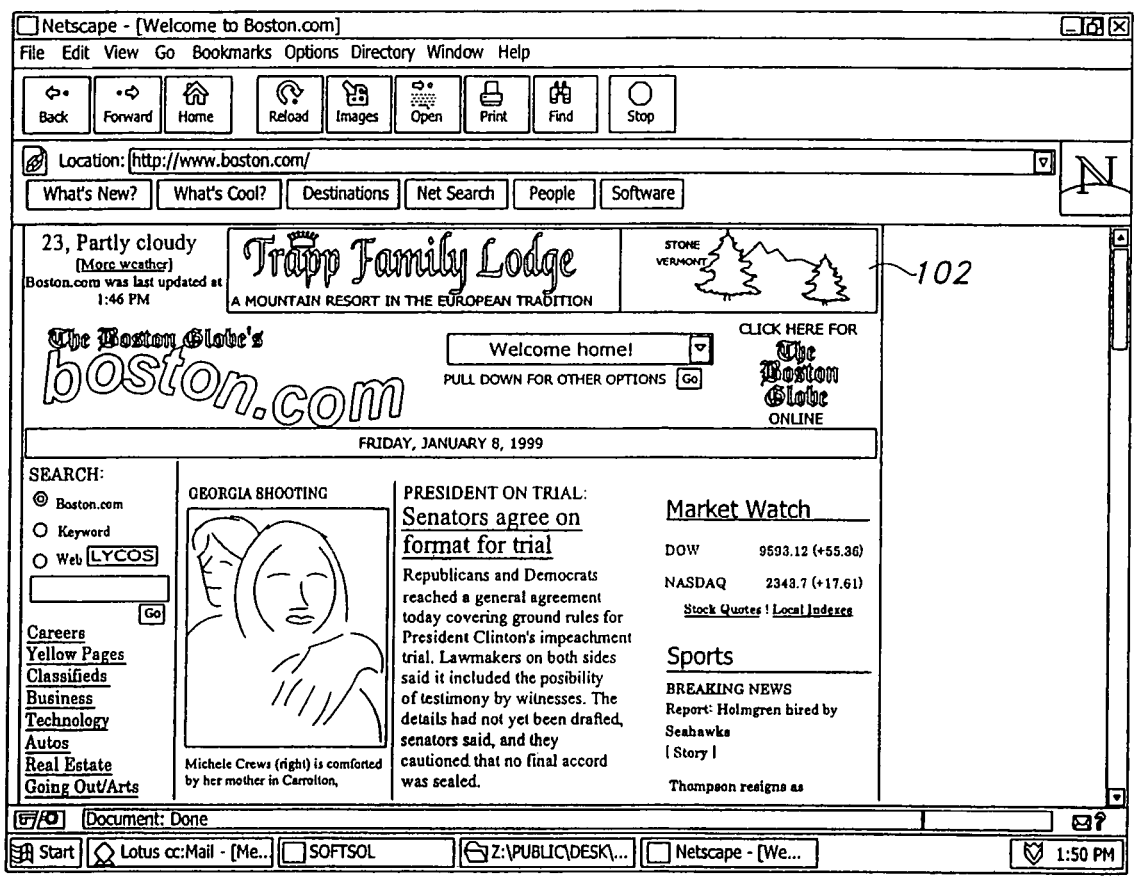
FIG. 1 is a screenshot of web-page that includes a banner, according to principles of the invention.
Figure 2:
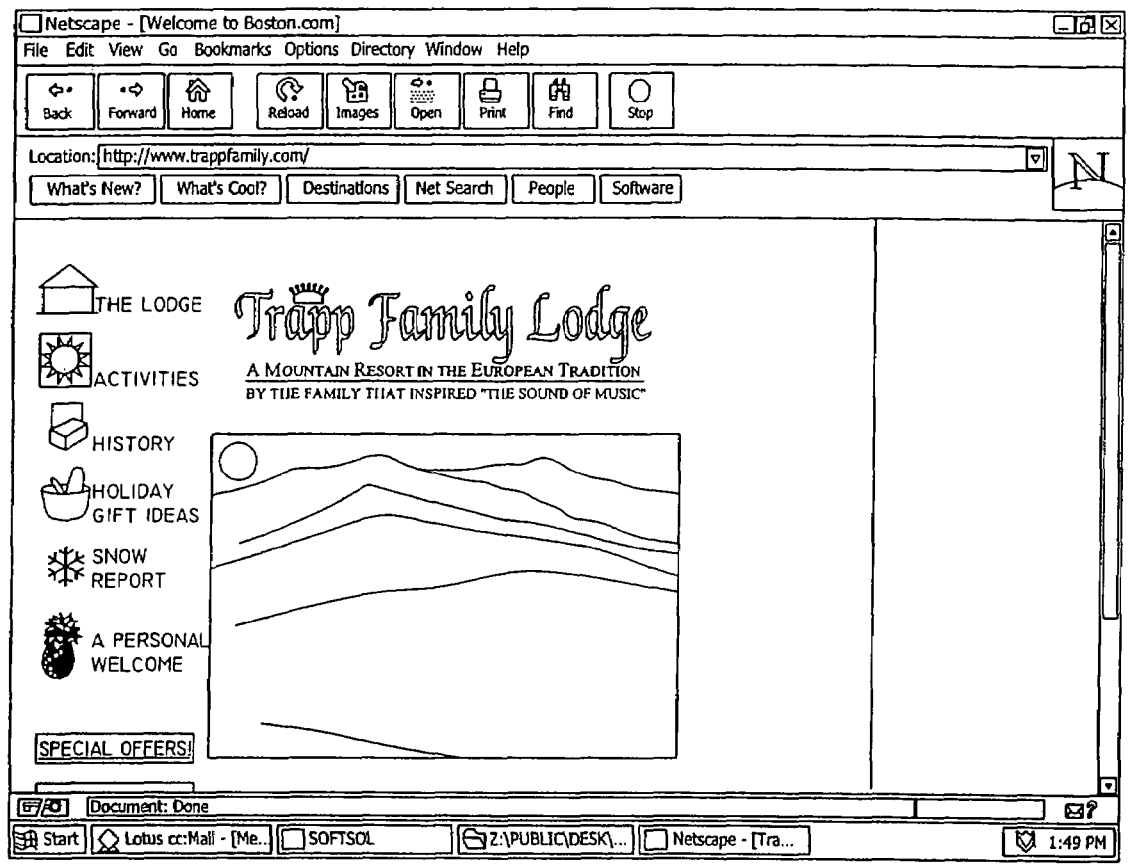
FIG. 2 is a screenshot of a web-page reached via the banner of FIG. 1.
Figure 3:
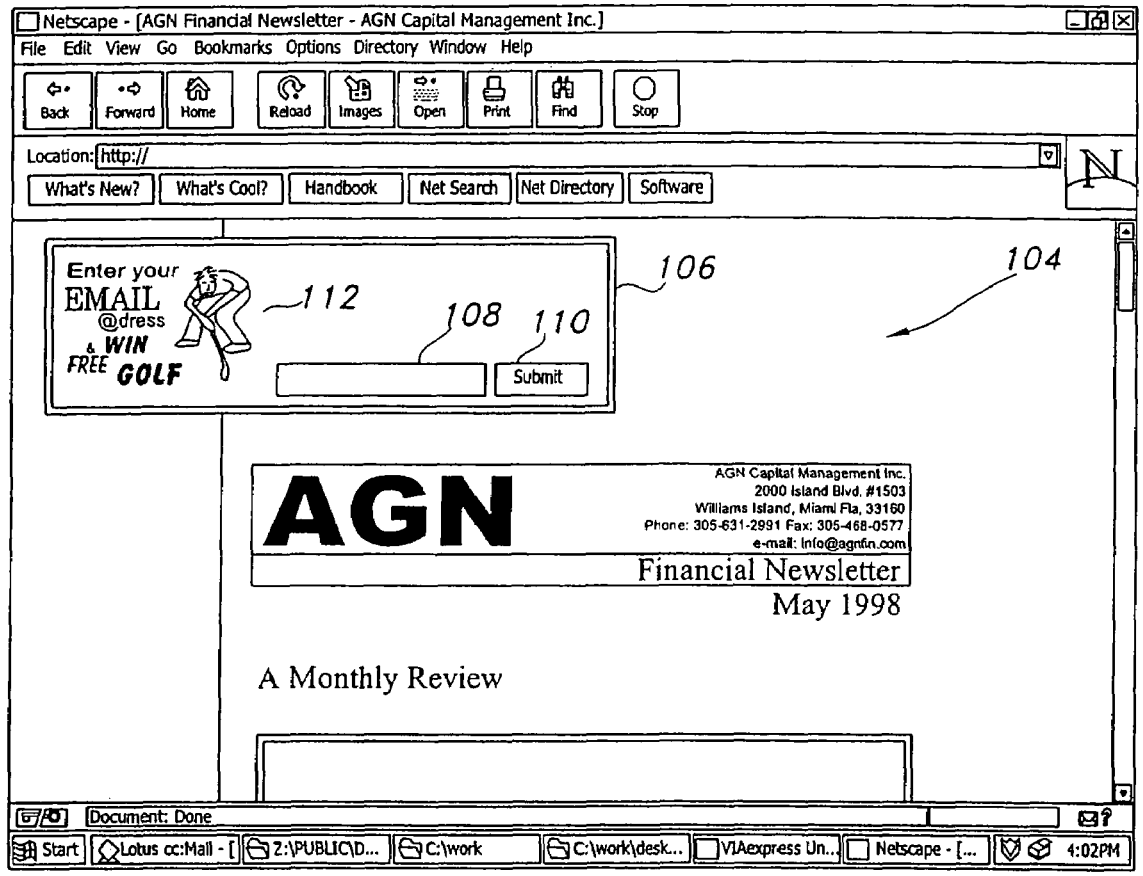
FIG. 3 is a screenshot of a web-page that includes a link, according to principles of the invention.

Referring to FIG. 3, a web-page 104 viewed by a network browser (e.g., Netscape™ Navigator) uses text and graphics to present information to a user. As shown, the text and graphics include information related to a business enterprise. The web-page 104 also includes a form 106 that accepts user input. As shown, the form 106 includes a text entry control 108, and a submit button 110. The form 106 also provides a graphic image 112 designed to attract attention. As shown, the form assumes the shape traditionally associated with banner-links (e.g., a bordered rectangle) but other shapes or formats could be used. The banner shape can communicate to a user that the form 106 is associated with a web-site other than the site the user is currently visiting. The form 106 can include other user input controls (not shown), for example, check-boxes that identify different areas of interest (e.g., "send me information on golf clubs" and "send me information on golf vacations").

Unlike a conventional banner-link, interaction with the form 106 does not transport the user to a different web-site. Instead, submitting entered information into the form (e.g., by typing information into the text box and then clicking the submit button 110) transmits the information entered by the user to a remote web-server without changing the current URL being displayed by the browser. The remote web-server uses the transmitted information to select and deliver electronic content (e.g., text, graphics, audio, video, and executable instructions) via e-mail. Co-pending U.S. patent application Ser. No. 09/199,150 entitled "Tracking Electronic Content" filed Nov. 24, 1998, now issued as U.S. Pat. No. 6,751,670, describes an electronic content delivery system, and is incorporated by reference.

Figure 4:
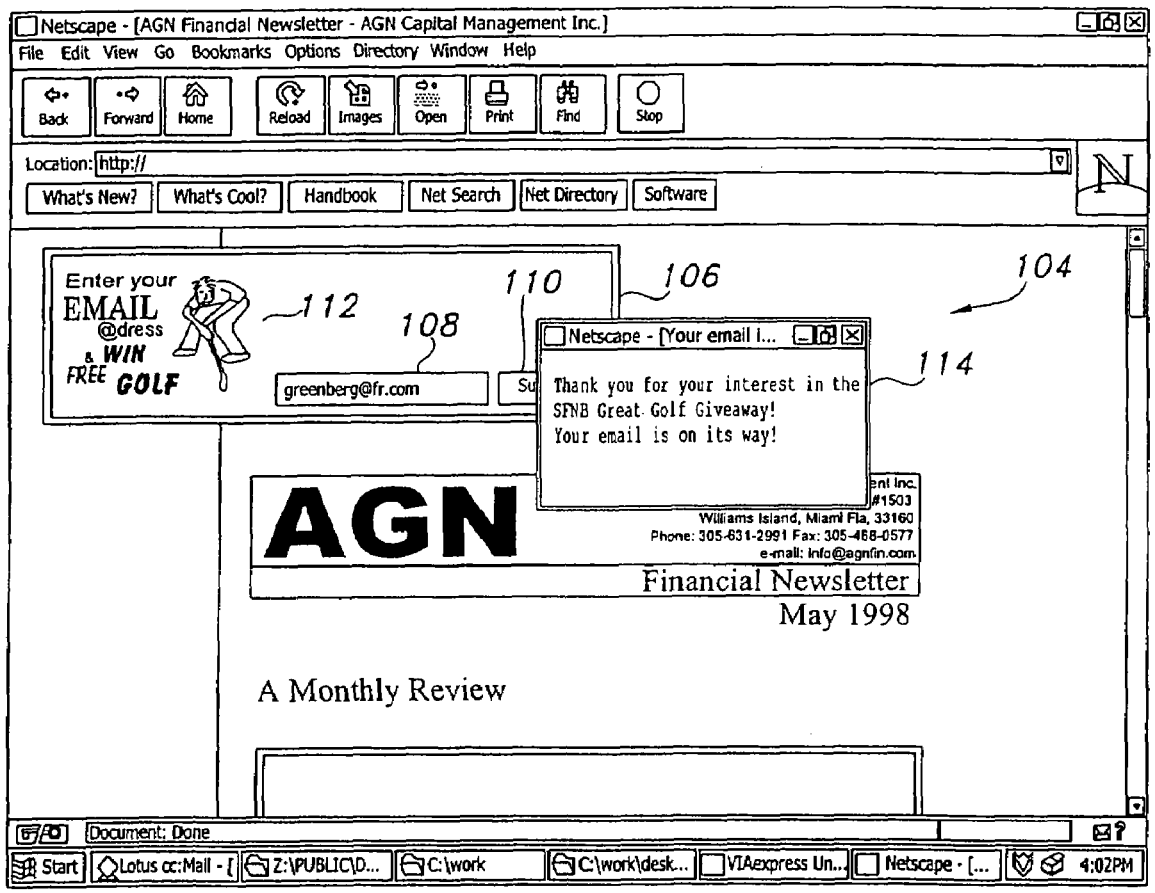
FIG. 4 is a screenshot of a submission confirmation window, according to principles of the invention.

Referring to FIG. 4, as shown, a user has entered a network e-mail address into the text field 108 and clicked the submit button 110. This action initiates transmission of the entered information to the remote web-server. After submitting the information, a window 114 appears informing a user that the information has been transmitted. The feedback provided by the window 114 prevents users from making repeated submissions in the mistaken belief their request failed.

Figure 5:
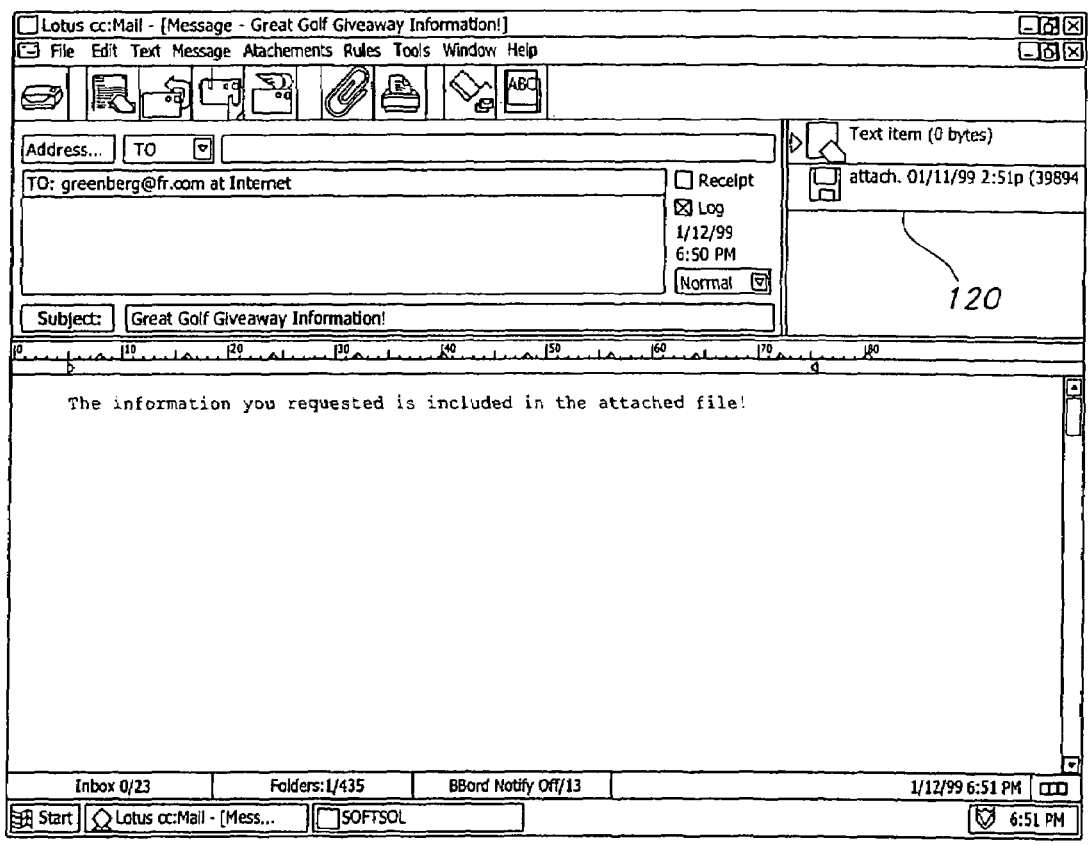
FIG. 5 is a screenshot of an e-mail message including electronic content, according to principles of the invention.

FIG. 5 shows the interface for an e-mail client. After the remote web-server has received the transmitted information, it selects the appropriate electronic content and e-mails the selected electronic content to the specified e-mail address. The requester then can view or otherwise access the delivered content using the e-mail client. As shown, the electronic content may be transmitted as an e-mail attachment 120. By delivering electronic content via e-mail, users can request information without interrupting their use of a currently displayed web-page 104 and without waiting for a linked site's web-page to load. Additionally, a business can deliver the content to an Internet user without the cost and expense of maintaining a web-site or reserving an Internet address.

Referring to FIG. 6, a network browser constructs a web-page's appearance from web-page instructions 104. These instructions 104 can be expressed in HTML (Hypertext Markup Language), Java, or other formats. When a user visits a web-page, the instructions 104 for the page are transmitted to the user's computer for processing by the user's browser. The instructions 104 describe the appearance and behavior of web-page elements. For example, the instructions describe the form 106, the graphic image 112, the text control 108, and submit button 110. The instructions 104 include instructions 120 for transmitting collected information to the remote web-server for processing. As shown, the instructions 106 identify a program 122 at a remote web-server and specify values for different parameters 124a-124c. The remote server program processes the parameters to select electronic content to deliver to a specified e-mail address 108. As shown, the program is a CGI (Common Gateway Interface) script, however, programs written in other programming languages can also process the collected information (e.g., a Perl script or a Java or C++ program).

As shown, the instructions 106 transmit the e-mail address 124c interactively collected from a user and an identification of the electronic content 124b to deliver to the e-mail address specified 124c. Instead of hard-coding the content to deliver 124b, the instructions 120 can transmit an I.D. that identifies electronic content to transmit. For example, different I.D.s can be assigned to different sets of instructions 120. That is, an I.D. for the golf promotion form may be "001" while the I.D. for a car promotion form may be "002". Though the same instructions 120 can be incorporated into different web-pages, the remote server can use the I.D. to select the electronic content to transmit (e.g., information on the golf or car promotion). By using an I.D. instead of hard-coding a reference to electronic content, electronic content transmitted to a user can be easily altered.

The instructions 106 can be copied into different web-pages to reach more web users. To identify the site that produced a request for electronic content, the instructions 106 can transmit a site identification token 124a of the site transmitting the information. This information can be hard-coded (as shown) or dynamically determined by interacting with a browser's API (Application Programming Interface). By transmitting the site token 124a, the remote web-server can identify which web-pages produced the most number of requests for content.

The instructions 106 can be configured to interactively collect a wide variety of information from a user in addition to an e-mail address. Such information can include demographic information (e.g., name, address, and age) or information describing a user's interests. The electronic content transmitted by the remote server can be selected based on this information.

Additionally, the instructions 106 can dynamically access a body of information stored, for example, on the user's computer, and then transmit that information to the remote web-server. For example, the instructions can access a Windows™ registry on the user's computer to collect user and system information relating to the computer executing the instructions.

Though the instructions 106 shown produce a form, the instructions 106 that collect an e-mail message by querying a user's computer (e.g., by accessing the Windows™ registry) could instead present a simple picture or text (e.g., "Click here for e-mail information on golf"). When a user clicks on the picture or text, the instructions 106 dynamically collect the user's e-mail address and other information from the system and transmit the collected information to the remote server without requiring any data entry by the user.

Figure 7A:
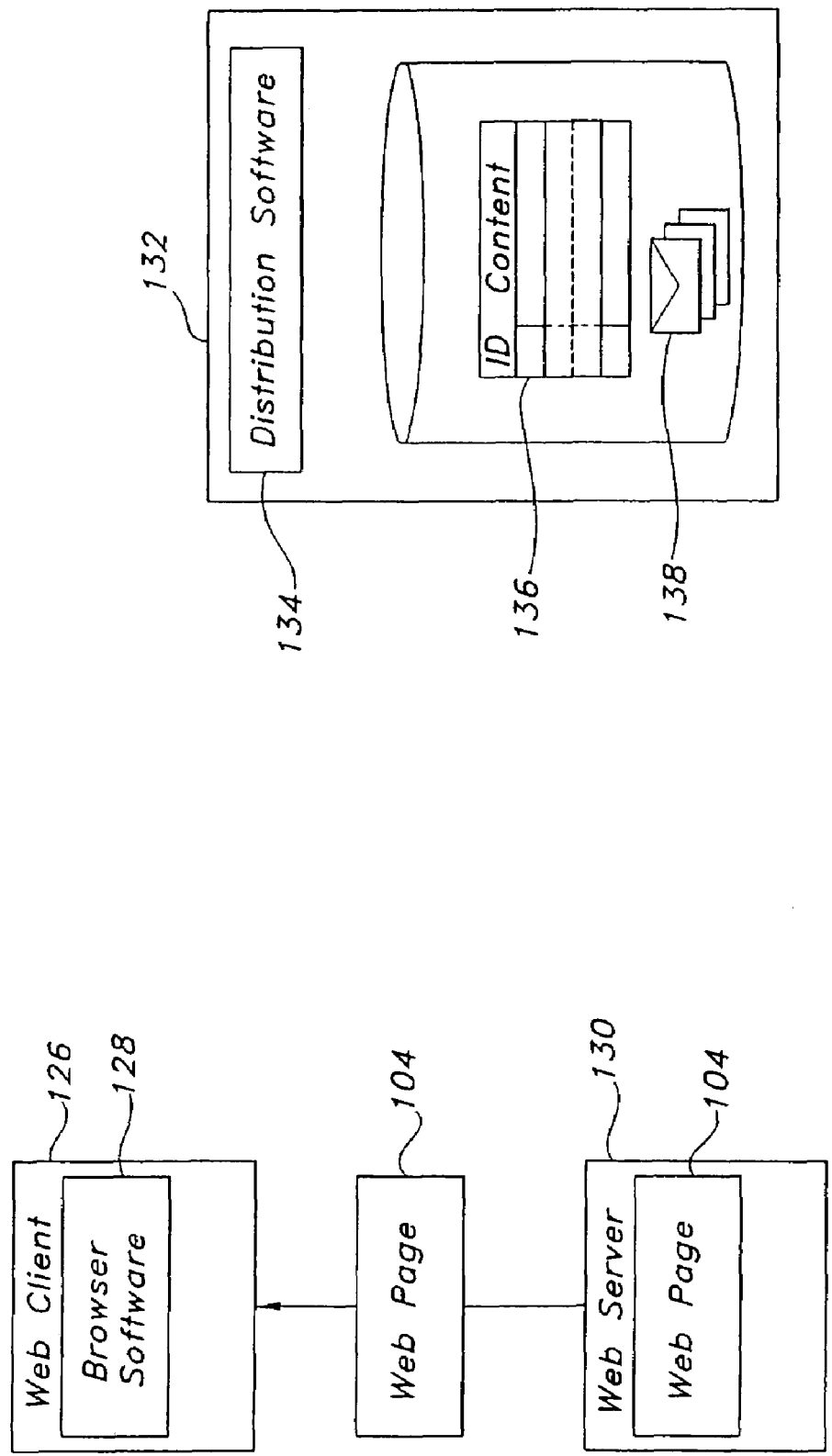
FIGS. 7A-7C are diagrams illustrating delivery of electronic content, according to principles of the invention.
Figure 7B:
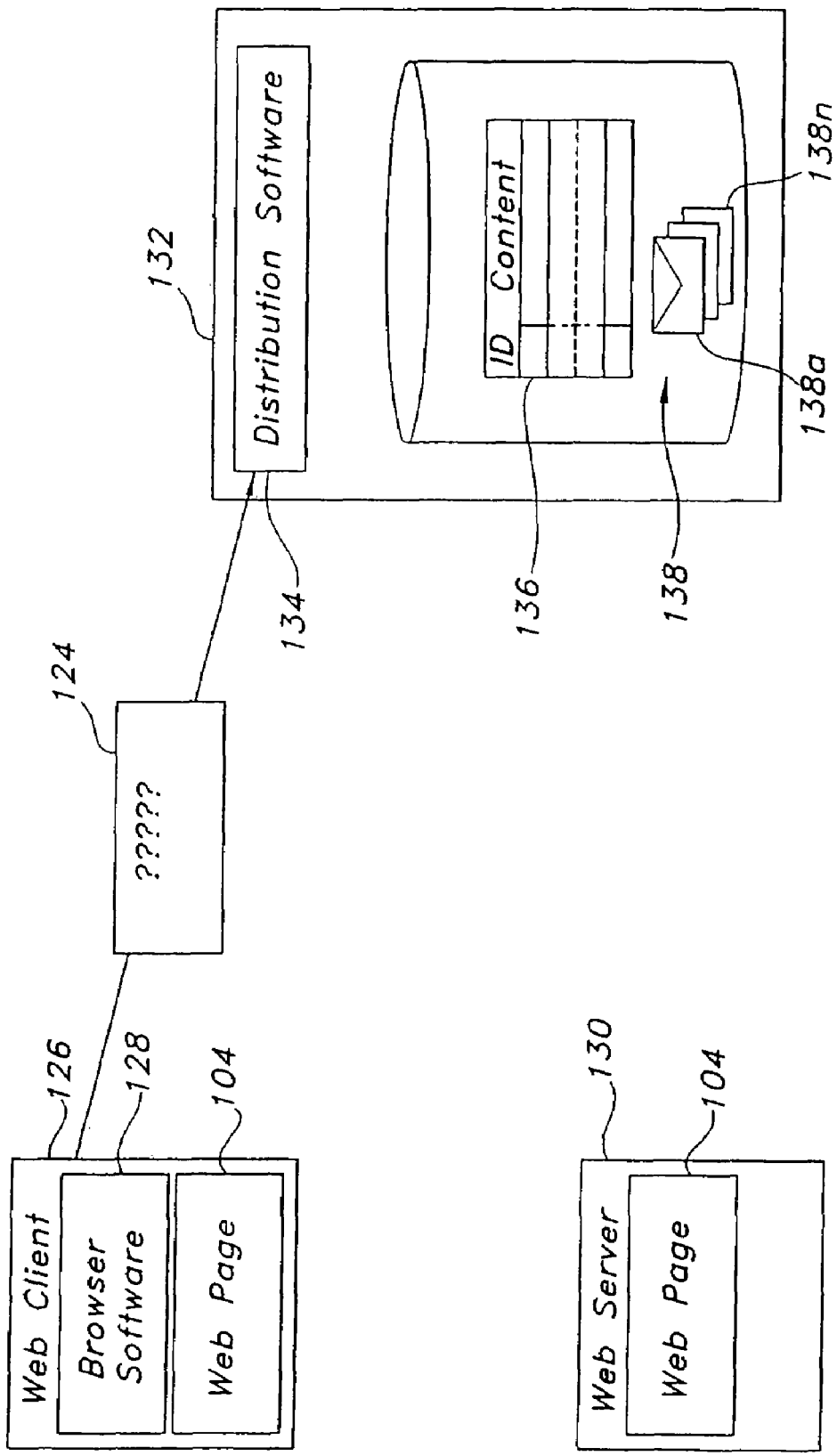
Figure 7C:
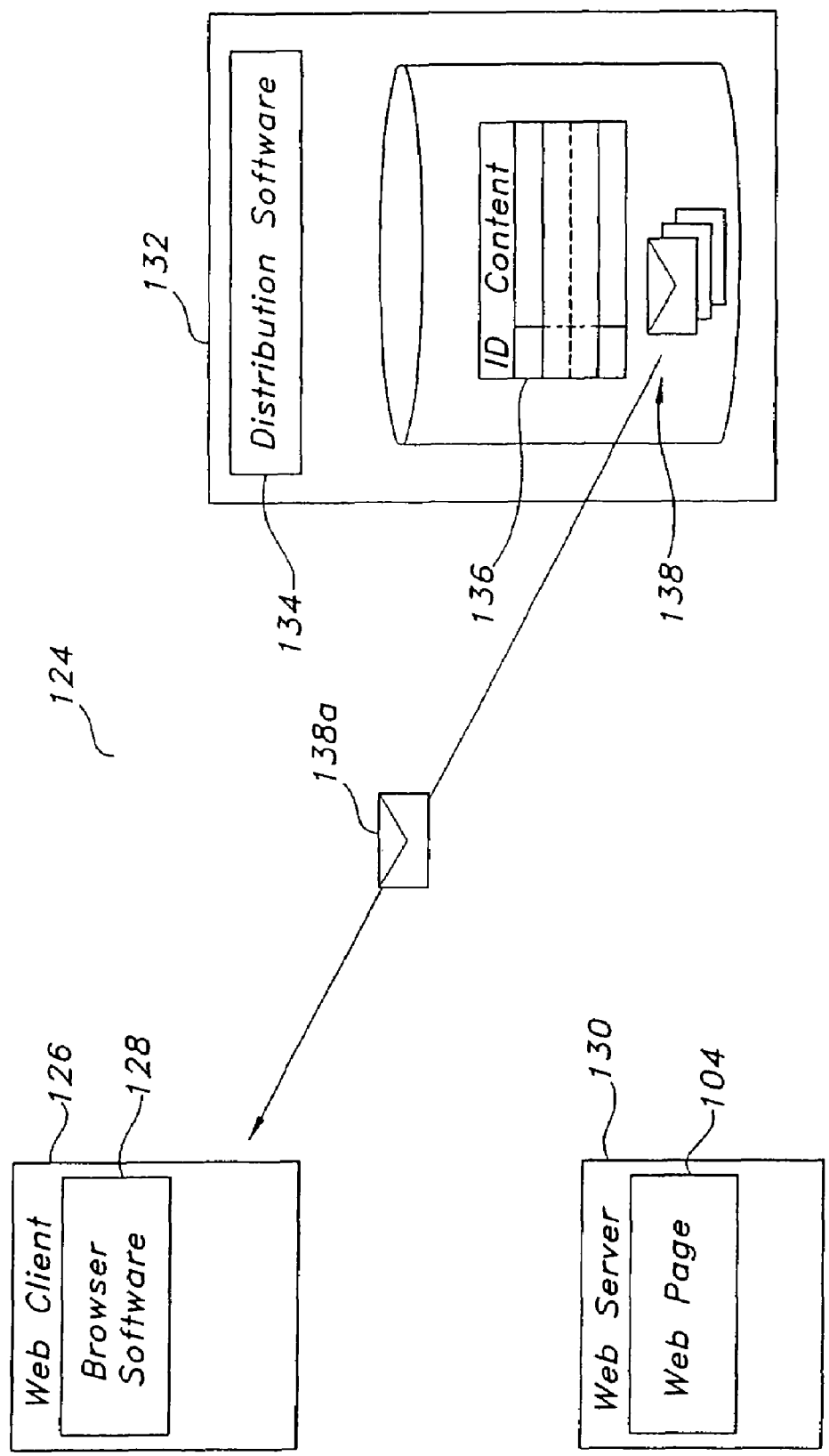

Referring to FIG. 7A-7C, a remote web-server 132 delivers electronic content 138 based on a user's interaction with a web-page 104. As shown in FIG. 7A, a user's computer 126 runs browser software 128. When the user navigates (e.g., by following a link or entering a URL) to a web-site, the web server 130 for that web-site transmits web-page instructions 104 to the user's computer 126. The user's browser 126 processes the web-page instructions 104 for display (as shown in FIG. 3).

Referring to FIG. 7B, the web-page 104 includes instructions 106 for collecting and transmitting information to the remote server 132. When a user submits a request for electronic content (e.g., clicking the submit button 110), the information 124 collected from a user and/or system is transmitted to the remote web-server 132. As described above, the information 124 includes an e-mail address and can include other information such as an I.D. and/or the address of the site 126 producing the request 124.

Referring to FIG. 7C, the remote web-server 132 includes a program 134 for processing the transmitted information 124. The program 134 can be a CGI script or alternatively a Perl, Java, or C++ program. The remote web-server also stores electronic content 138 for transmission to a requesting user. The remote web-server 132 also may include a table 136 that stores the electronic content 138 that should be sent in response to an I.D. included received information. The remote web-server 132 selects and transmits the electronic content 138a via e-mail to the e-mail address specified in the received information 124.

The remote web-server 132 produces reports based on requests that indicate which addresses received content, which web-pages produced content requests, and demographic information describing the user's requesting information. Thus, businesses can closely track their efforts at reaching users.

The remote web-server 132 can store electronic content 138 corresponding to any number of different sets of instructions 106 (e.g., different forms). Thus, a single web-server 132 can provide electronic content delivery for a large number of different businesses or organizations. Processing requests for content typically consumes considerable computational resources on the processing computer. In addition, storing the content 138 typically requires a large volume of non-volatile storage. By letting a remote web-server dedicated to processing requests handle delivery and storage of content, the computers associated with the various enterprises will not be slowed or otherwise burdened by the processing of requests during business hours.

Figure 7D:
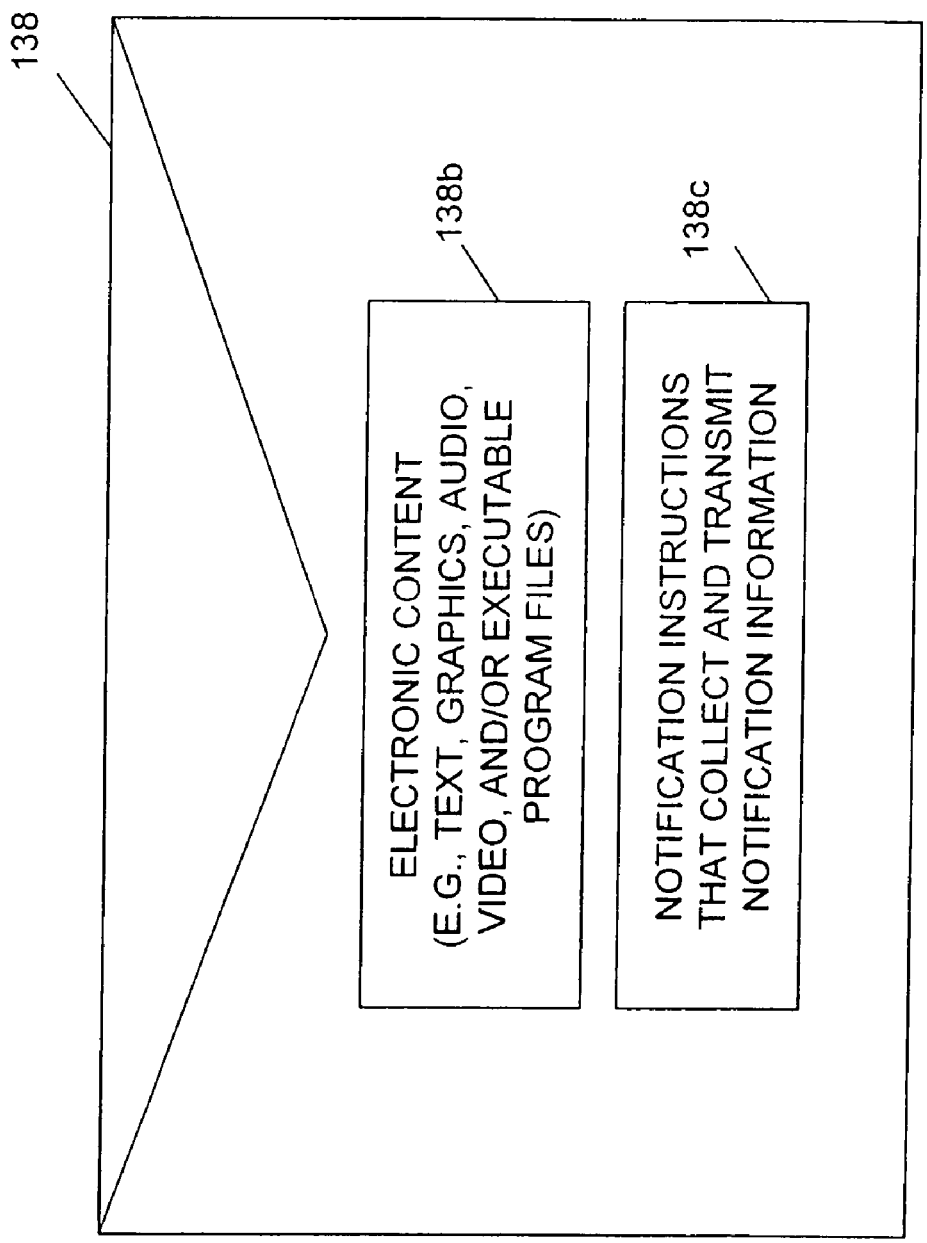
FIG. 7D is a block diagram of an embodiment of electronic content, according to principles of the invention.

Referring to FIG. 7D, the electronic content 138 may include electronic content 138b such as text, graphics, audio, video, and/or executable files. Electronic content 138 may also include notification instructions 138c that may be executable instructions that collect and transmit notification information. The notification instructions 138c may be configured to control access to the electronic content 138b. Further, different electronic content may use different file formats. When executed, notification instructions 138c can determine whether a previous attempt to access the electronic content 138b resulted in success (e.g., successful transmission of notification information or receipt of an access granting message). The notification instructions 138c may interactively collect notification information from a recipient. The notification instructions 138c may interactively collect notification information from a recipient. The notification instructions 138c may also collect information by querying the recipient's computer system.

Figure 7E:
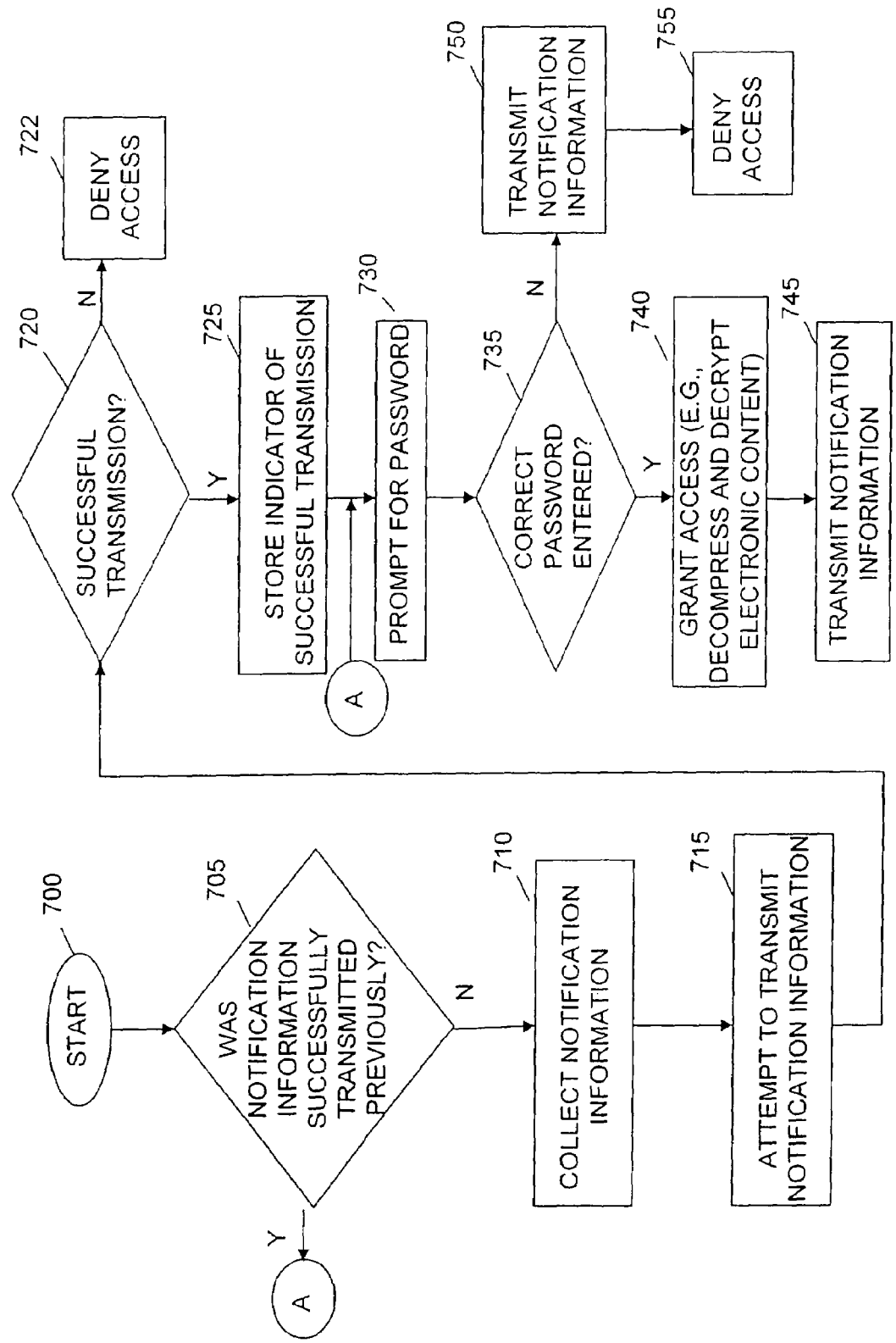
FIG. 7E is a flow diagram showing steps of processing notification instructions, according to principals of the invention.

FIG. 7E is a flow diagram showing steps of processing the notification instructions, according to principles of the invention, starting at step 700. At step 705, a check is made whether notification information was transmitted successfully previously. If successful, then the process continues at step 730. Otherwise, if the notification information has not been successfully transmitted, then at step 710, notification information may be collected. At step 715, an attempt to transmit the notification information may be made. At step 720, a check may be made to determine if the transmission of notification information was successful. If not successful, then at step 722, access is denied to the electronic content. If, however, the transmission of notification information was successful, then at step 725, an indicator may be stored indicating successful transmission. At step 730, a prompt for a password may occur. At step 735, a check may be made whether a correct password was entered. If the password was not correctly entered then, at step 750, an attempt to transmit notification information may occur. At step 755, access to electronic content may be denied. If, however, a correct password was entered, or, if prompted for, then at step 740, access may be granted to the electronic content (e.g., decompress and decrypt). At step 745, an attempt to transmit notification information may occur.

Referring to FIG. 8, the program 134 running on the remote web-server 132 processes information to select and e-mail electronic content to a specified e-mail address. After receiving a request for electronic content (140), the program 134 may repress transmission of information to a user's browser (e.g., for example by issuing an "echo status: 202 No Response" command). This command prevents a user's display from being altered.

The program 134 can use the I.D. to determine which electronic content to send to a specified address (142). The program 134 can also analyze demographic data included in the received information 124 to select electronic content for delivery. After selecting the electronic content, the program 134 can e-mail the determined content (144) to the e-mail address specified in the request 124.

Figure 9:
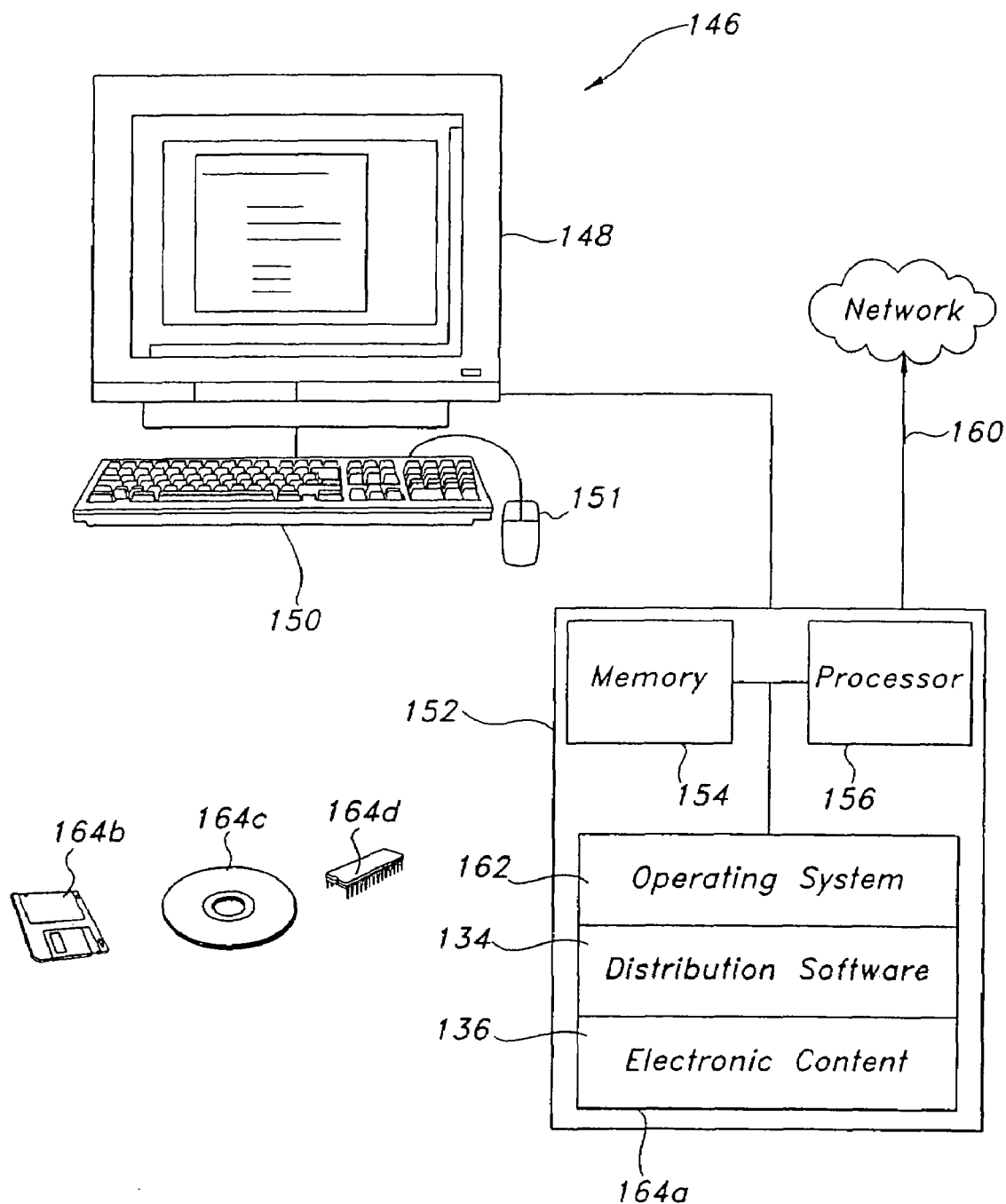
FIG. 9 is an exemplary diagram of a computer system, according to principles of the invention.

Referring to FIG. 9, a computer platform 146 includes a monitor 148, input devices such as a keyboard 150 and mouse 151, and a digital computer 152. The digital computer 152 includes memory 154, a processor 156, a mass storage device 164a (e.g., a hard disk) and a network connection 160 for transmitting and receiving data. The mass storage device 164a includes instructions for an operating system 162 (e.g., Windows™ 98), distribution software 134, and electronic content 138. These instructions can be stored in other computer readable mediums such as a floppy disk 164b, a CD-ROM drive 164c, or other hardware such as an EPROM 164d. In the course of operation, the stored instructions are transferred to memory 154 and the processor 156 for execution.

The techniques described here are not limited to any particular hardware or software configuration. The techniques may be implemented in hardware or software, or a combination of the two. Preferably, the techniques are implemented in computer programs executing on programmable computers that each include a processor, a storage medium readable by the processor (including volatile and non-volatile memory and/or storage elements), at least one input device, and one or more output devices. Program code is applied to data entered using the input device to perform the functions described and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the following claims.

What is claimed is:

1. A computer-implemented method of delivering electronic content, the method comprising the steps of:
   providing instructions that causes a first computer to dynamically transmit a network address to a second computer in response to a request for data;
   processing the request for data at the second computer;
   transmitting the requested data to the network address;
   receiving notification information from across a network as a result of an attempt to access the requested data; and
   wherein the instructions include executable instructions configured to: a) attempt to transmit the notification information based upon the attempt to access the requested data, and b) grant or deny access to the requested data based on the results of the attempt to transmit.

2. The computer-implemented method of claim 1, wherein the executable instructions collect the notification information.

3. The computer-implemented method of claim 1, wherein the step for providing instructions comprises providing web-page instructions.

4. The computer-implemented method of claim 3, wherein the web-page instructions comprise at least one of: HTML instructions and form instructions.

5. The computer-implemented method of claim 1, wherein the instructions comprise instructions that query the computer for information.

6. The computer-implemented method of claim 1, wherein the instructions comprise instructions that receive user input.

7. The computer-implemented method of claim 1, wherein the requested data comprises demographic information.

8. The computer-implemented method of claim 1, wherein the requested data comprises system information.

9. The computer-implemented method of claim 1, wherein the network address identifies the first computer.

10. The computer-implemented method of claim 9, further comprising the step of presenting an invitation to request the data, prior to the providing step.

11. The computer-implemented method of claim 1, wherein the network address comprises an identifier associated with a user using the first computer.

12. The computer-implemented method of claim 1, wherein the requested data comprises at least any one of: text, video, computer instructions and audio information.

13. The computer-implemented method of claim 1, wherein the requested data comprises graphics information.

14. The computer-implemented method of claim 1, wherein the step of processing comprises selecting the electronic content based on the received notification information.

15. The computer-implemented method of claim 1, wherein the notification information includes at least any one of:
   identification of the instructions that transmitted the notification information, and
   identification of an electronic device that transmitted the notification information.

16. A computer-implemented method of delivering electronic content, the method comprising the steps of:
   providing web-page instructions that induces a first computer to dynamically transmit an network address to a second computer in response to a request for data;
   processing the request at the second computer to select electronic content and transmitting the electronic content to the network address;
   receiving notification information from the network address triggered by an event; and
   wherein the instructions include executable instructions are configured to: a) attempt to transmit the notification information based on the event, and b) selectively grant or deny access to the electronic content based on results of the attempt to transmit.

17. The computer-implemented method of claim 16, wherein the executable instructions are configured to collect the notification information.

18. The computer-implemented method of claim 16, wherein the network address is associated with a user requesting the data.

19. The computer-implemented method of claim 17, wherein the requested data comprises at least any one of: text, video, computer instructions and audio information.

20. A computer-implemented method of providing access to electronic content, the method comprising the steps of:
   initiating a display in a browser of a web-page that includes a link corresponding to electronic content;
   receiving, in response to a selection of the link, dynamically transmitted information including a network address at a server;
   initiating transmission of the electronic content to the network address, wherein the electronic content includes executable instructions;
   receiving notification information as a result of an attempt to access the electronic content; and
   wherein the executable instructions are configured to: a) attempt to transmit the notification information based on a triggering event, and b) selectively grant or deny access to the electronic content based on results of the attempt to transmit.

21. The computer-implemented method of claim 20, wherein the executable instructions are configured to collect the notification information.

22. The computer-implemented method of claim 21, wherein the initiating transmission step initiates transmission of the electronic content from the server.

23. The computer-implemented method of claim 22, wherein the network address is associated with a selector of the link.

24. The computer-implemented method of claim 20, wherein the electronic content comprises at least any one of: text, video, computer instructions and audio information.

25. The computer-implemented method of claim 20, wherein the network address comprises an email address.

26. A computer program, disposed on computer readable storage medium, the computer program including computer interpretable logic to cause execution of the steps for:
   providing instructions that causes a first computer to dynamically transmit a network address to a second computer in response to a request for data;
   processing the request for data at the second computer;
   transmitting the requested data to the network address;
   receiving notification information from across a network as a result of an attempt to access the requested data; and wherein the instructions include executable instructions configured to: a) attempt to transmit the notification information based upon an attempt to access the requested data, and b) grant or deny access to the requested data based on the results of the attempt to transmit.

27. The computer program product of claim 26, wherein the instructions collect the notification information.

28. The computer program product of claim 26, wherein the step for providing instructions comprises providing web-page instructions.

29. The computer program product of claim 28, wherein the web-page instructions comprise at least any one of: HTML instructions and form instructions.

30. The computer program product of claim 26, wherein the instructions comprise instructions that query the computer for information.

31. The computer program product of claim 26, wherein the instructions comprise instructions that receive user input.

32. The computer program product of claim 26, wherein the requested data comprises demographic information.

33. The computer program product of claim 26, wherein the requested data comprises system information.

34. The computer program product of claim 26, wherein the network address identifies the first computer.

35. An apparatus for delivering access to electronic content, comprising:
    means for initiating a display in a browser of a web-page that includes a link corresponding to electronic content in a computer system;
    means for receiving at a server, in response to a selection of the link, dynamically transmitted information including a network address;
    means for initiating transmission of the electronic content to the network address, wherein the electronic content includes executable instructions;
    means for receiving notification information as a result of an attempt to access the electronic content; and
    wherein the executable instructions are configured to: a) attempt to transmit the notification information based on a triggering event, and b) selectively grant or deny access to the electronic content based on results of the attempt to transmit.

36. The apparatus of claim 35, wherein the executable instructions are configured to collect the notification information.

37. The apparatus of claim 35, wherein the means for initiating transmission initiates transmission of the electronic content from the server.

38. The apparatus of claim 35, wherein the network address is associated with a selector of the link.

39. The apparatus of claim 35, wherein the electronic content comprises at least any one of: a text file, a video file, a computer instructions file and an audio information file.

40. The apparatus of claim 35, wherein the network address is an email address.

* * * * *